(12) United States Patent
Spiesshofer et al.

(10) Patent No.: US 11,826,813 B2
(45) Date of Patent: Nov. 28, 2023

(54) TRANSFER SYSTEM FOR PRESSES AND PRESS ASSEMBLY

(71) Applicant: AIDA EUROPE GMBH, Weingarten (DE)

(72) Inventors: Thomas Spiesshofer, Weingarten (DE); Christian Müller, Weingarten (DE); Elmar Weber, Weingarten (DE); Anett Pfohl, Weingarten (DE)

(73) Assignee: AIDA EUROPE GMBH, Weingarten (DE)

( * ) Notice: Subject to any disclaimer, the term of this patent is extended or adjusted under 35 U.S.C. 154(b) by 0 days.

(21) Appl. No.: 17/924,550

(22) PCT Filed: May 10, 2021

(86) PCT No.: PCT/DE2021/100426
§ 371 (c)(1),
(2) Date: Nov. 10, 2022

(87) PCT Pub. No.: WO2021/228326
PCT Pub. Date: Nov. 18, 2021

(65) Prior Publication Data
US 2023/0294157 A1    Sep. 21, 2023

(30) Foreign Application Priority Data
May 11, 2020  (DE) ...................... 10 2020 112 613.1

(51) Int. Cl.
*B21D 43/05*    (2006.01)
*B30B 15/30*    (2006.01)
(Continued)

(52) U.S. Cl.
CPC ......... *B21D 43/052* (2013.01); *B21D 43/105* (2013.01); *B30B 15/30* (2013.01); *B65G 47/902* (2013.01); *B21D 43/05* (2013.01)

(58) Field of Classification Search
CPC .. B65G 47/902; B65G 47/907; B21D 43/105; B21D 43/05; B21D 43/052; B25J 19/0008; B25J 19/0016; B30B 15/30
(Continued)

(56) References Cited

U.S. PATENT DOCUMENTS 2,618,337 A * 11/1952 Heller .................. B21D 43/105
271/42
3,270,379 A *  9/1966 Sehn .................... B22D 17/2084
164/404
(Continued)

FOREIGN PATENT DOCUMENTS

DE         3420134 C2    6/1995
DE        19801229 C1   12/1998
(Continued)

OTHER PUBLICATIONS

International Search Report and Written Opinion, PCT/DE2021/1000426, dated Sep. 21, 2021, 11 pages.

Primary Examiner — James R Bidwell

(57) ABSTRACT

Proposed is a transfer system for presses, having at least two fastening units arranged opposite one another, wherein each of the fastening units in each case has a first fastening region. The transfer system further has a press transfer unit, consisting of two movement arms arranged opposite one another, as well as a crossbar connected thereto for receiving and for transporting, i.e. including setting down, a workpiece. Each of the movement arms has a first drive unit connected to the first fastening region, a first lever arm, a second drive unit, and a second lever arm. The first lever arm is connected at a first end thereof or between the first and a second end to the first drive unit, and at the second end thereof to the second drive unit. The second lever arm is rotatably connected at a first end thereof to the second drive unit, and is movably connected with a second end thereof to (Continued)

the crossbar. In addition, at least one energy-storing element is provided for each movement arm, which energy-storing element is formed and arranged in such a way that its force or a force component thereof points in the acceleration direction of the crossbar with or without. In an embodiment c1, a second fastening region is provided on the fastening unit, and the energy-storing element is connected directly or indirectly with a first end thereof to the second fastening region, and is fastened on a second end thereof at a specified region of the movement arm. In an additional or alternative embodiment c2, the energy-storing element is fastened with a first end to the first lever arm and with a second end thereof to the second lever arm.

27 Claims, 6 Drawing Sheets

(51) Int. Cl.
*B21D 43/10* (2006.01)
*B65G 47/90* (2006.01)
(58) Field of Classification Search
USPC ................................................ 198/468.6
See application file for complete search history.

(56) References Cited

U.S. PATENT DOCUMENTS

| | | | | |
|---|---|---|---|---|
| 4,077,523 A | * | 3/1978 | Spanke | B21J 13/08 414/742 |
| 2002/0192058 A1 | * | 12/2002 | Harsch | B21D 43/05 414/738 |
| 2012/0326373 A1 | * | 12/2012 | Takeda | B21D 43/052 269/74 |
| 2020/0094421 A1 | * | 3/2020 | Morimura | B25J 17/00 |

FOREIGN PATENT DOCUMENTS

| | | | | |
|---|---|---|---|---|
| DE | 10009574 A1 | 8/2001 | | |
| DE | 102005004387 A1 | 8/2005 | | |
| DE | 20321229 U1 | 5/2006 | | |
| DE | 102012009108 A1 | 10/2012 | | |
| DE | 202019104088 U1 | 8/2019 | | |
| EP | 1129800 | * | 12/2000 | ............ B21D 43/05 |
| EP | 161317 B1 | 1/2003 | | |
| EP | 1313575 B1 | 9/2005 | | |
| KR | 20150015592 | * | 2/2015 | ............ B30B 15/30 |

\* cited by examiner

TRANSFER SYSTEM FOR PRESSES AND PRESS ASSEMBLY

The invention relates to a transfer system for presses and a press assembly.

Transfer systems transport workpieces to be machined from one press to a next press of a press assembly. The movement arms of the transfer system perform movements in the horizontal and vertical direction or a combination thereof, respectively. For this purpose, an articulated kinematics is provided, in the case of which the vertical movement is performed via a so-called dynamic lifting axis. An articulated kinematics of this type is disclosed, for example, in the German patent application DE 100 09 574.7 A1.

A device for transporting workpieces in a press is further known from EP 1 313 575 B1, in the case of which a movement arm consisting of two lever arms, which are of equal length and which are coupled mechanically via a corresponding deflection means, is proposed. A vertical movement of the entire movement arm takes place by means of a lifting axis.

A single-arm transfer system, which can be used flexibly in particular in the case of limited space, is additionally known from the German utility model DE 20 2019 104 088 U1. This is attained by means of at least two articulated levers, which are connected to one another via an axis of rotation and one of which is connected to a base, which is fastened to a lifting device. Here, the articulated levers are also moved by displacing the lifting axis.

Due to the fact that large masses have to be moved at high speed or high accelerations, respectively, by means of the lifting device or the lifting axis, respectively, high drive torques with high energy consumption are required, and high forces and high speeds act in guides, which can lead to a quicker wear. This is addressed in EP 1 161 317 B1 in that a transport system is provided, which has a weight compensation cylinder acting in the vertical direction, in order to reduce the load on the drive elements. This weight compensation cylinder is fastened to the carriage, on which the pivot or transport arm, respectively, is supported.

A device for transporting molded parts between machining stages of a multi-support transfer press, press line, forming machine system, or the like, comprising a transverse crossbar comprising holding elements, such as suction spiders or the like for transferring and/or positioning the molded parts is further known from DE 10 2006 037 365 B4. The transverse crossbar thereby comprises at least two partial crossbars, which are arranged offset from one another in at least one spatial direction.

Due to the fact that there is still potential for improvement with regard to reducing the load on the drives, it is an object of this invention to provide an energy-efficient and compact transfer system for presses as well as a press assembly. This object is solved according to the invention by means of the features of the independent patent claims. Advantageous designs are subject matter of the dependent claims.

The term press will also be understood below to be a machining station of a multi-ram press. The terms press and machining station will thus be used synonymously below.

Proposed is a transfer system for presses, having at least two fastening units arranged opposite one another, wherein each of the fastening units in each case has a first fastening region. The transfer system further has a press transfer unit, consisting of two movement arms arranged opposite one another, as well as a crossbar connected thereto for receiving and for transporting, i.e. including setting down, a workpiece. Each of the movement arms has a first drive unit connected to the first fastening region, a first lever arm, a second drive unit, and a second lever arm. The first lever arm is connected at a first end thereof or between the first and a second end to the first drive unit, and at the second end thereof to the second drive unit. The second lever arm is rotatably connected at a first end thereof to the second drive unit, and is movably connected with a second end thereof to the crossbar. In addition, at least one energy-storing element is provided for each movement arm, which energy-storing element is formed and arranged in such a way that its force or a force component thereof points in the acceleration direction of the crossbar with or without workpiece. In an embodiment c1, a second fastening region is provided on the fastening unit, and the energy-storing element is connected directly or indirectly with a first end thereof to the second fastening region, and is fastened on a second end thereof at a specified region of the movement arm. In an additional or alternative embodiment c2, the energy-storing element is fastened with a first end to the first lever arm and with a second end thereof to the second lever arm.

As described, the movement arms, more precisely the first drive unit of each of the movement arms, are fastened at a specified height at a first fastening region of the fastening unit provided for this purpose. The height of the fastening is a function of the type of the press or of the machining stations, respectively, and the workpiece to be machined. A workpiece can be an individual component as well as can consist of several partial pieces, which are received jointly by the crossbar or the tooling fastened thereto, respectively.

The lifting movement is currently only possible by a movement along the vertical axis. The drive for this is referred to as dynamic lifting axis or lifting device. Large forces act here and high drive torques are required because the entire transfer unit, including axle with engine, transmission, etc., has to be moved with high dynamics, i.e. quick changes of the movements caused by braking or accelerating, respectively, have to be converted. Overlapped movements from the vertical and horizontal direction can be realized without a dynamic lifting axis by means of two lever arms for each movement arm, which are connected to one another and which are in each case equipped with drive units, which can be controlled independently of one another.

This means that any point in the required transfer region can be approached by providing two drive units for each movement arm, without having to vertically move the entire mass of the press transfer unit.

The proposed energy-storing element acts in the acceleration direction of the crossbar, thus not only in the vertical direction, so that it acts as energy storage for supporting the movement of the movement arm. The peak values of the drive torques can thus be reduced significantly during the entire motion sequence. The design and arrangement of the energy-storing element thus significantly influences the dimensioning of the drive units. It is attained by means of the proposed arrangement of the energy-storing element that the drive units are supported and the load on them is thus reduced in movement regions, in which they are heavily strained, in particular in the collision-critical region. This takes place in that the energy-storing elements are charged with energy, e.g. when using a mechanical coil spring by means of compression, or when using an electromechanical spring element by charging the electrical energy storage, or by using a weight element, and/or by outputting the charged energy. The drive units can thus be designed to be smaller, which saves weight, energy, and thus costs.

The transfer region is also the collision-critical region, when at least parts of the press transfer unit are located within the machining region or the tool region, respectively, of a press or machining station, respectively, as well as the region, which it not collision-critical. This is the region, in which the press transfer unit is located outside of machining regions of the machining stations, e.g. in the region between two presses or machining stations, respectively, but outside the machining region. There are also critical regions, in which a collision of the press transfer units with one another has to be ruled out.

As already mentioned, two movement arms comprising a crossbar arranged thereon are provided, which are arranged opposite one another and which pass through a specified motion sequence, in order to transfer a workpiece from a press, also referred to as machining station below, into the next press. The movement arms thereby have an initial position, in which at least the first lever arm stands virtually vertically, i.e. virtually in a vertical axis.

By moving in a specified motion sequence, the movement arms are moved from the initial position into a first position, in which a workpiece is received, and by passing the initial position into a second position, in which the workpiece is set down, and back, i.e. from the second position at least into the initial position. A workpiece can thus be transferred from one press or machining station, respectively, to the next one. After the workpiece has been received in the first position, thus a first press or machining station, respectively, it is moved to the second position, thus to the next press or machining station, respectively, by passing the initial position, and is set down there for further processing. The movement arm then moves empty, i.e. without workpiece, either only back into the initial position, or it moves to the first position again, in order to receive a further workpiece, and to then set the latter down again in the second position by passing through the motion sequence.

The energy-storing element is thereby designed in such a way that it has a minimally stored energy in the initial position, and is in each case charged with energy to a specified degree in a movement phase between initial position and first position and/or between initial position and second position, depending on the embodiment of the energy-storing element. It outputs the stored energy again in a movement phase between second position and initial position and/or between first position and initial position.

By arranging the energy-storing element in such a way that it stores energy in a certain movement phase, which also comprises the braking, this energy can be used again to accelerate the movement arm and thus the crossbar without or without workpiece, so that at least one drive unit is supported. The entire system thus works more energy-efficiently over the entire motion sequence. This means that energy is saved directly in that drive peaks are reduced by means of the energy-storing element. In addition, the drive units can be dimensioned to be smaller, so that an indirect saving of energy takes place in that weight is saved. The energy-storing element has a linear or non-linear characteristic curve, which can be designed so as to be capable of being changed in a time- or travel-controlled manner.

In one embodiment, a pivot drive is provided, which is arranged on the movement arm in such a way that it can rotate or turn, respectively, the crossbar about its longitudinal axis or close to its longitudinal axis. In a further embodiment, the pivot drive is provided in combination with a mechanical deflection device, which is configured to hold the crossbar in the horizontal position during the entire motion sequence. The pivot drive can be controlled independently of the drive units.

To provide for the movement of the crossbar for transferring workpieces between, to, or from presses or machining stations, respectively, of a press assembly, the movement arms are formed identically, but symmetrically to one another. This assembly consisting of a pair of movement arms and the crossbar is also referred to as press transfer unit. The movement arms are advantageously also aligned identically, i.e. the movement arms generally also follow the same or a very similar motion sequence, so that a workpiece arranged on the crossbar can be moved to the presses or machining stations, respectively, in a press assembly. The movement arms thus move in planes, which are parallel to one another, more precisely vertical planes. They are controlled independently of one another by means of drive units, which are independent of one another. They can thus move synchronously with one another, but also asynchronously to a certain extent, e.g. in order to realize a tilted position of the crossbar. A length compensation is to then be provided on one of the two ends of the crossbar for this purpose.

In a further embodiment, the first drive unit is arranged between the first and the second end of the first lever arm, and the energy-storing element is connected to the first end.

In a further embodiment, the first drive unit is arranged between the first and the second end of the first lever arm, and a third lever arm is provided, which is rotatably fastened with a first end thereof to the first end of the first lever arm, and with a second end thereof to a third fastening region, which is provided on the fastening unit and which can be shifted in the vertical direction, and wherein the energy-storing element is connected to this second end. The third fastening region is mechanically coupled to the third lever arm, i.e. it always moved with the latter. To realize this, it can be capable of being shifted dynamically, e.g. via a carriage.

In a further embodiment, the energy-storing element is formed as mechanical spring element or pneumatic spring element or electromechanical spring element, and, in the case c1, is connected directly to the second fastening region because its first end is connected directly thereto. Currently used spring elements serve only for the weight compensation in the vertical direction in order to reduce the weight force, which is applied to the press transfer unit, of the mass, which is to be moved. By using a spring element, the force or force component of which acts in the direction of movement of the crossbar, the load on the drive units is reduced, as already described.

In a further embodiment, the energy-storing element is connected indirectly to the second fastening region in the case c1 because a deflection means, e.g. in the form of a deflection roller, is provided on the second fastening region. The energy-storing element has a pulling means, e.g. a rope or a belt, and a weight element, which is fastened to a first end of the pulling means. The second end of the pulling means is fastened to the specified region of the movement arm, and the pulling means is guided via the deflection means.

In a further embodiment, a third fastening region arranged on the fastening unit as well as a spring element are provided, wherein the spring element is fastened with a first end to the weight element and with its second end to the third fastening region.

In a further embodiment, the spring element is formed as mechanical spring element or pneumatic spring element or electromechanical spring element.

In a further embodiment, at least one setting means, which is arranged on the fastening unit, is provided, on which the first and second fastening regions are arranged, wherein at least one of the setting means can be shifted in its height along a vertical axis. By providing a setting means, a height adjustment can take place at least during the tool change. Different embodiments are possible thereby. The setting means is advantageously formed as a guided carriage, which can be adjusted via an assembly axis.

In a further embodiment, the setting means is formed in one piece in such a way that the first and second fastening regions are arranged thereon at a specified distance from one another. In an alternative embodiment, the setting means is formed in several pieces in such a way that a respective one of the first and second fastening regions is arranged on one of the setting means, wherein each setting means can be adjusted individually, or the setting means can only be adjusted simultaneously with one another.

In one embodiment, it is provided that the first and/or second lever arms are formed so as to be capable of being set in their length. In an alternative embodiment, the first and/or the second lever arm can be changed dynamically in their length, i.e. are formed to be extendable or retractable via separate drives. In one embodiment, the first and the second lever arm have lengths, which are identical or different from one another. A further assembly axis is thus provided in order to be able to perform tool-specific height settings or changes to the step distance. An assembly axis, which is to be provided on the fastening unit, can thus be replaced, and the press transfer unit can be used more flexibly.

In one embodiment, it is provided that the crossbar has a length compensation on one of its two ends.

In one embodiment, it is provided that the crossbar consists of two partial crossbars, which can be coupled to one another at a coupling point.

In one embodiment, it is provided that a tooling fastened to the crossbar is divided according to the coupling point.

In one embodiment, it is provided that the coupling point is formed rigidly or in an articulated manner or with length compensation or in an articulated manner with length compensation.

In one embodiment, it is provided that in the event that the partial crossbars are uncoupled from one another, only one of the movement arms is operated.

In one embodiment, it is provided that a further movement arm is provided in the transport direction downstream from or upstream of the movement arm, which is operated, and for the joint transport of a workpiece is operated with the same motion sequence thereto, and can otherwise be operated independently thereof.

A press comprising a described press transfer system is further provided in the context of the present invention, wherein the fastening units are mounted to the press frame of the press. In the alternative, a press comprising a described press transfer system as well as a frame, which is detached from the press and to which the fastening units are attached, is further provided.

A press assembly is further provided in the context of the invention, having several presses or machining stations, respectively, which are arranged one behind the other and in a specified machining direction in such a way that a workpiece can be transferred from a first all the way to a last press or machining station, respectively, by means of the movement arms.

In one embodiment, a press transfer system is in each case arranged centrally between two consecutive presses.

In one embodiment, the first one of the presses or machining stations, respectively, has two additional fastening units, which are arranged opposite one another, which are arranged on the side of the press, from which the workpieces are fed to the press assembly for the first time for machining purposes. In addition or in the alternative, the last one of the presses has two additional fastening units, which are arranged opposite one another, which are arranged on the side of the press, from which they are removed from the press assembly after the last machining.

As already mentioned, the movement arms follow the same motion sequence, so that a workpiece arranged on the crossbar can be moved in a press assembly between, to, or from the presses or machining stations, respectively, by moving the movement arms with the crossbar arranged thereon. As already mentioned, a system of movement arms and fastening units can also be provided as feed device, thus upstream of a first press or machining station, respectively, of a press assembly, and/or as discharging device, thus downstream from a last press or machining station, respectively, of a press assembly. These embodiments are likewise covered in this respect, when reference is made below only to a moving between two presses or machining stations, respectively.

Further features and advantages of the invention follow from the following description of exemplary embodiments of the invention, on the basis of the figures of the drawing, which shows details according to the invention, and from the claims. The individual features can in each case be realized either individually or several of them in any combination in a variation of the invention.

Preferred embodiments of the invention will be described in more detail below on the basis of the enclosed drawing.

FIG. 1 shows a schematic sectional illustration of a press assembly according to an embodiment of the present invention.

FIGS. 2 to 5 in each case show a schematic sectional illustration of movement arms and fastening units comprising an energy-storing element formed as spring element according to different embodiments of the present invention.

FIG. 6 shows a schematic sectional illustration of a movement arm comprising a combination of deflection device and pivot drive according to an embodiment of the present invention.

FIGS. 7 and 8 in each case show a schematic sectional illustration of movement arms and fastening units comprising an energy-storing element consisting of pulling means and weight element according to different embodiments of the present invention.

Identical elements or functions, respectively, are provided with identical reference numerals in the following descriptions of the figures.

Figure 1:
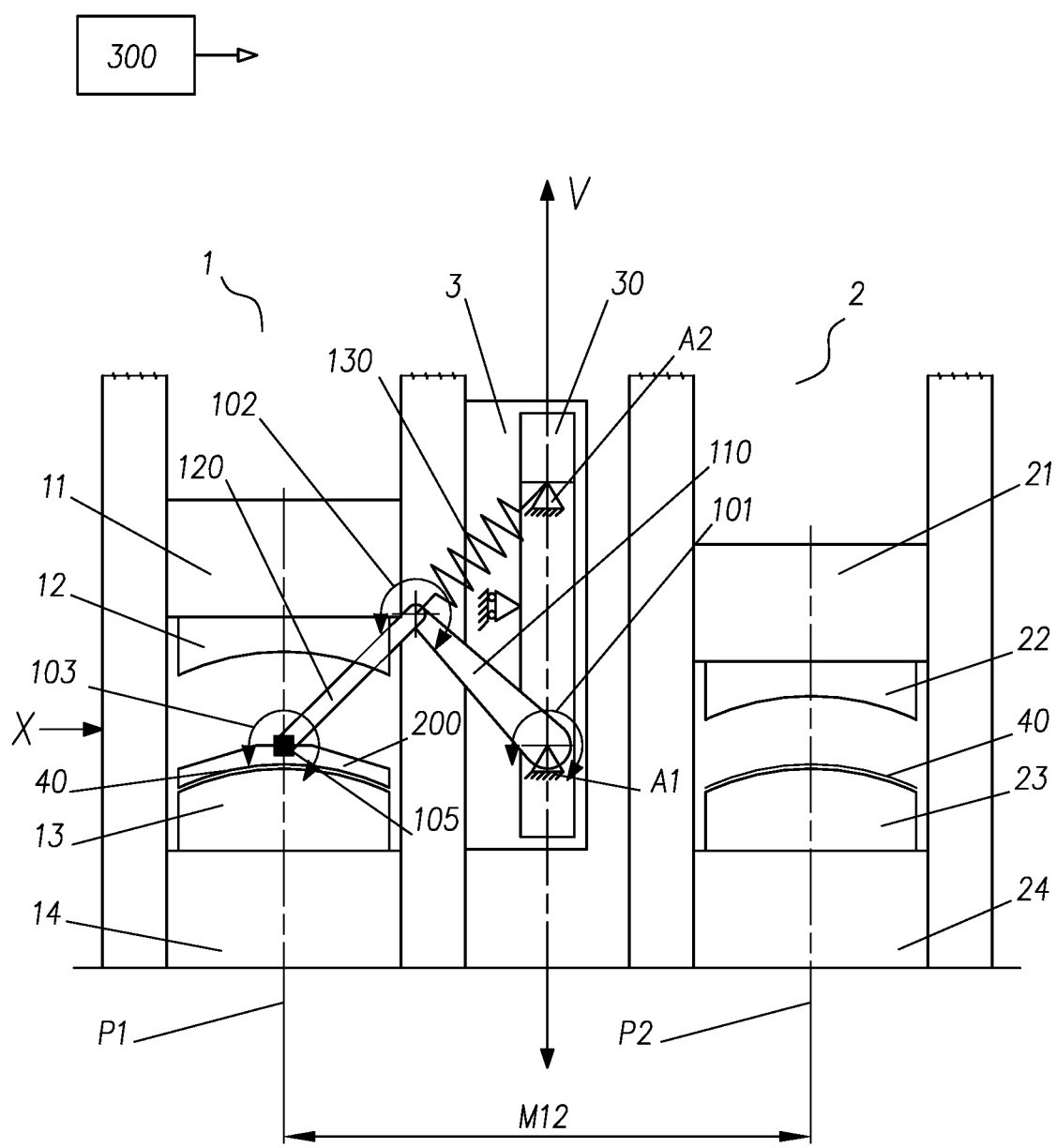

Each press 1, 2, also referred to as machining station 1, 2 below, has a ram 11; 21, to which a top tool 12; 22 is fastened. A bottom tool 13; 23 resting on a press bed 14; 24 is arranged below the ram 11; 21 at a distance therefrom. A machining region, into which a workpiece 40 be machined is introduced by means of a press transfer unit arranged on the fastening units 3, lies between top tool 12; 22 and bottom tool 13; 23. Top tool 12; 22 and bottom tool 13; 23 then close, so that the workpiece 40 is machined. While the tool 12, 13; 22, 23 opens, the workpiece 40 is moved out of the machining region again by means of the press transfer unit, and is inserted into the next machining station 2, which is arranged at a distance M12 from the previous machining station 1. In this embodiment, the distance M12 is the center-to-center distance between two presses or machining stations 1, 2, respectively. The control of the press transfer unit or of several consecutive press transfer units takes place via a control unit or computing unit 300, respectively, which is either connected as external device to the presses or machining stations 1, 2, respectively, which are to be controlled, or which is installed directly in one or several machining stations 1, 2 or components thereof, or a combination thereof. Workpieces 40 to be machined are received, for example, by means of a tooling 200, such as a suction spider, are transported in the passage direction or direction of movement X, respectively, and are positioned.

The movement arms, which have a first lever arm 110 and a second lever arm 120, thereby follow specified laws of motion and tool-specific motion sequences, as will be described later. Due to the fact that the crossbar 105 including tooling 200 is fastened to the lever arms 120 with the workpiece 40 to be machined, it thus also follows the sequences of motion, and the workpiece 40 can be moved back again through the presses or machining stations 1, 2, respectively, in the transport direction or passage direction, respectively, or direction of movement X, and after setting down the workpiece 40. It is important to note thereby that the machining region is a collision-critical region because at least parts of the movement arms, the crossbar 105, and the tooling 200 are located within the machining region of the press or machining station 1, 2, respectively, for a certain period of time during the introduction and during the removal of the workpiece 40. When no machining takes place, the movement arm is located in an initial position S, in which at least the first lever arm 110 is arranged so as to stand virtually in the vertical axis V.

As shown in the figures, each movement arm has a first lever arm 110, which is movably connected on a first end thereof to the first drive unit 101. On the opposite end, a further drive unit 102 is fastened thereto, which connects the first lever arm 110 to a first end of a second lever arm 120. The crossbar 105 connects both movement arms and serves the purpose of receiving one or several workpieces 40 to be machined, for example by means of a tooling 200, such as a suction spider, which is fastened thereto, and to transport it/them from one press or machining station 1, 2, respectively, into the next one in the transport direction or passage direction X, respectively. Said crossbar can also be used as feed or discharge unit, wherein it is then arranged upstream of the first or downstream from, respectively, the last press or machining station 1, 2, respectively.

The crossbar 105 can have different toolings 200, such as a suction spider, for holding workpieces 40, in order to receive, to transport, to position and to set down workpieces 40 to be machined.

Figure 6:
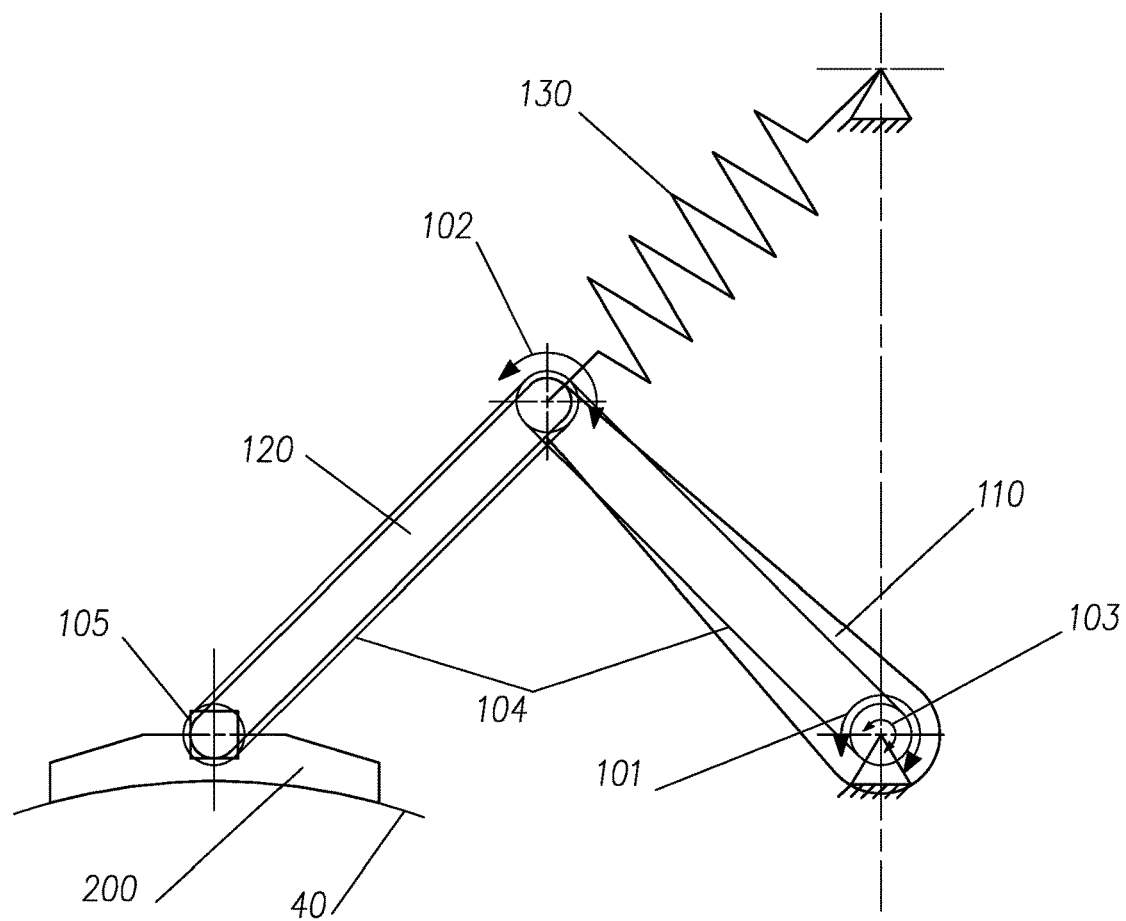

During the movement of the movement arm, it is the goal that the crossbar 105 always lies horizontally. A mechanical deflection device 104 can be used for this purpose. Depending on the design of the workpiece 40, an active additional pivoting of the crossbar 105 and thus of the workpiece 40 in a certain region of the transport path, thus the collision-critical region, can be required. It can be provided in this case that the crossbar 105 is additionally rotated/pivoted by means of an independently controllable pivot drive 103. A combination of known deflection device 104 and pivot drive 103 is thus used, as shown in FIG. 6. The pivot drive 103 can thus be dimensioned to be significantly smaller, which effects a reduction of the dead weight to be moved, and which provides freedoms in construction and design during the placement of the pivot drive 103, for example within the crossbar profile.

The first lever arm 110 can have the same length as the second lever arm 120. However, the lever arms 110, 120 can also have different lengths. The lever arms 110 and 120 can furthermore be embodied so as to be capable of being set or changed in their length, thus so as to be extendable or retractable by means of separate drives, in order to provide for a tool-specific adaptation of the transfer region. The second lever arm 120 is movably connected with its first end to the second drive unit 102, thus does not protrude beyond it like current articulated kinematic drives, or is even guided via an additional carriage.

In FIGS. 1 to 6, the below-described energy-storing element 130, 132 is embodied as spring element 103, 132, and in FIGS. 7 and 8 as pulling means 141 comprising weight element 142.

FIG. 1 shows a schematic sectional illustration of a press assembly comprising two presses or machining stations 1, 2, respectively, as well as a fastening unit 3, which is arranged between the presses or machining stations 1 and 2, respectively, and which is fastened to the first press or machining station 1, respectively. In the alternative, the fastening unit 3 could also be fastened (in all embodiments) to a separate, i.e. free-standing frame. In each embodiment, the first drive unit 101 can be arranged as centrally as possible between two presses or machining stations 1, 2, respectively, so that an essentially symmetrical motion sequence is possible.

In this embodiment, the first and the second fastening region A1, A2 are arranged on a setting means 30, which is formed in one piece and which can be shifted in the vertical axis V. The setting means 30 can thereby be capable of being shifted dynamically or non-dynamically (as assembly axis). The fastening regions A1, A2 can thus only be shifted jointly. In the alternative, the fastening regions A1, A2 can also be formed separately from one another, i.e. the setting means 30 is then formed as two-piece setting means 31, 32. In each of the shown embodiments, the setting means 30-32 can generally also be omitted.

FIG. 1 further shows an energy-storing element 130, which is formed as spring element 130 and which is fastened with one end region in extension of the second lever arm 120 or to the second drive unit 102, respectively, and with the other end region directly to the fastening region A2 of the fastening unit 3. The spring element 130 serves as energy storage, is thus a mechanical spring element or a pneumatic spring element, thus, e.g., a pneumatic cylinder, or an electromechanical spring element. The spring element 130, 132 is formed and arranged in such a way that its force or a force component thereof points in the acceleration direction of the crossbar with or without workpiece 40.

In the embodiments shown in FIGS. 1, 2, and 5 to 8, the energy-storing element 130, due to its arrangement, serves the purpose of acting in the same direction of movement as the crossbar 105, in order to accelerate or brake it. In the embodiment, which is shown in FIG. 3 and which will be described below, the spring element 130 is arranged in the vertical axis V, but, due to the lever arrangement comprising three levers 110, 120, 131, acts in the direction of movement of the crossbar 105 with or without workpiece 40 fastened thereto. In the embodiment shown in FIG. 4, the spring element 132 is arranged as coil spring between the first and the second lever arm 110, 120. In all cases, the energy-storing element 130, 132 acts in such a way that the press transfer unit can be moved more dynamically out of the region, which is at risk for collision, and can provide support during the braking of the workpiece 40 in the collision-critical region, so that the required drive torque of the drive unit 101 and/or drive unit 102 is reduced. The exact effect will be described later on the basis of the diagram shown in FIG. 9.

FIGS. 2 to 8 in each case show an enlarged, schematic sectional illustration of movement arms, fastening units 3, and setting means 30-32.

Figure 2:
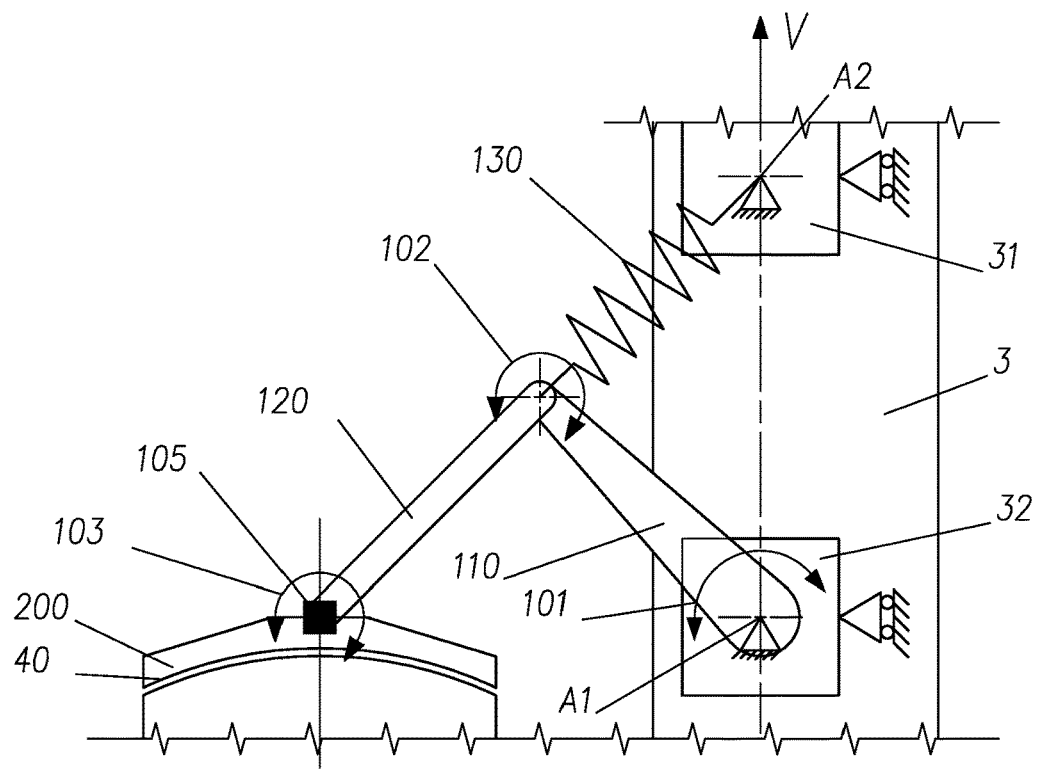
Figure 3:
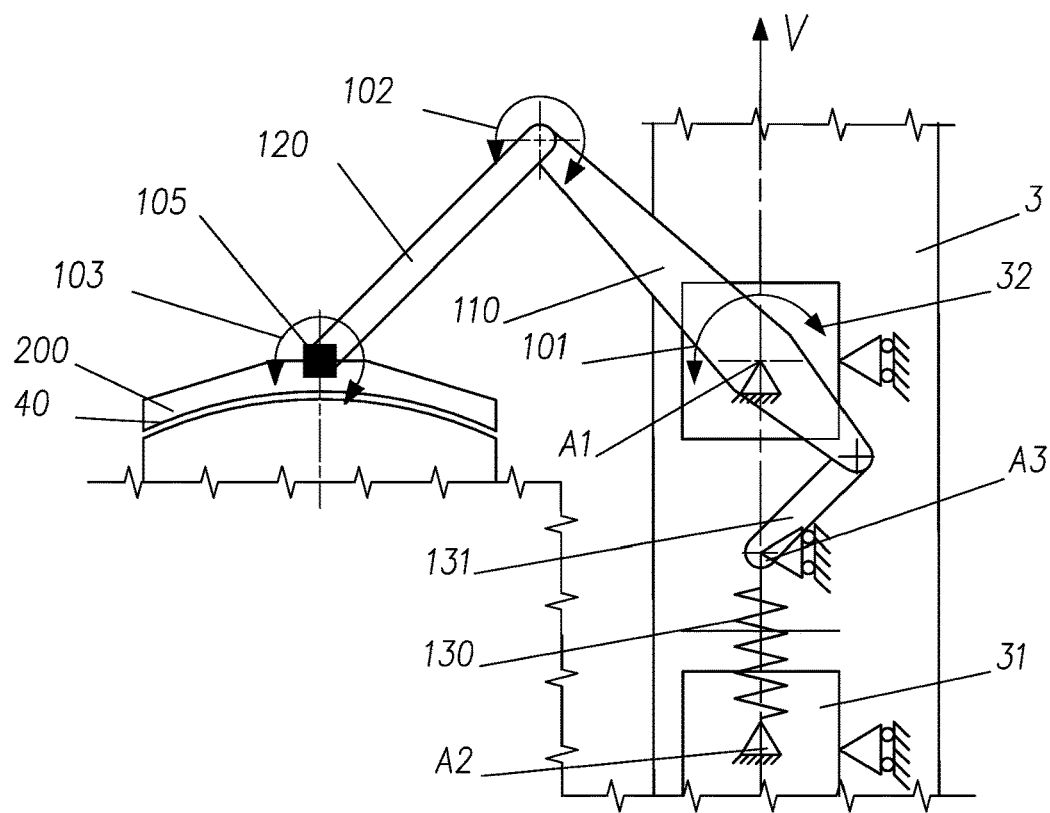
Figure 5:
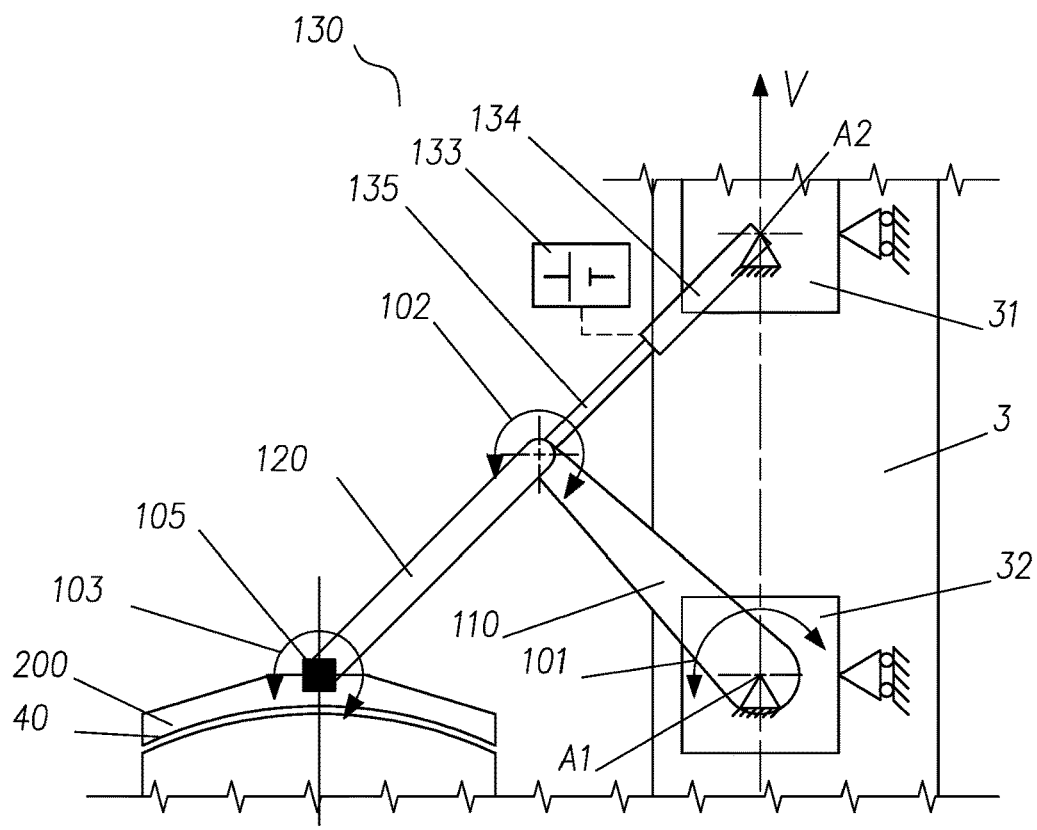

In FIGS. 2, 3, and 5, the setting means 30 is embodied in several pieces 31, 32, i.e. the fastening regions A1 and A2 can be capable of being adjusted separately from one another. The third fastening region A3 shown in FIG. 3 is mechanically coupled to the third lever arm 131 and can thus be shifted together with the latter. Said third lever arm is thus advantageously arranged on the fastening unit 3, e.g. via a displaceable carriage. Due to the fact that both movement arms are constructed identically or mirror-inverted to one another, respectively, in order to guide the crossbar 105, only one movement arm is described. In addition and only to simplify the illustration, a setting means is not shown in FIGS. 7 and 8.

The adjustment of the setting means 30-32 in the vertical direction V, thus in their height, can take place gradually, e.g. manually by means of a grid, or continuously, e.g. by means of an electromotive adjustment axis.

In FIG. 3, the setting means 30 is likewise embodied in two pieces 31, 32, wherein an embodiment is shown here, in the case of which the first end of the first lever arm 110 protrudes beyond the first drive unit 101, i.e. the first drive unit 101 is arranged between the first and the second end of the first lever arm 110. A third lever arm 131 is fastened with a first end thereof to the outermost end of the first lever arm 110, so as to be movably connected. The second end of the third lever arm 131 is fastened to a third fastening region A3, which, as already described, is mechanically coupled to the third lever arm 131 and which is displaceably arranged on the fastening unit 3. In addition, a spring element 130 is attached with a first end thereof on the second end of the third lever arm 131.

The spring element 130 is fastened with its second end to a second fastening region A2 of the fastening unit 3. The third lever arm 131 serves the purpose of transferring the restoring force of the spring element 130 to the remaining part of the movement arm and the first drive unit 101.

Figure 4:
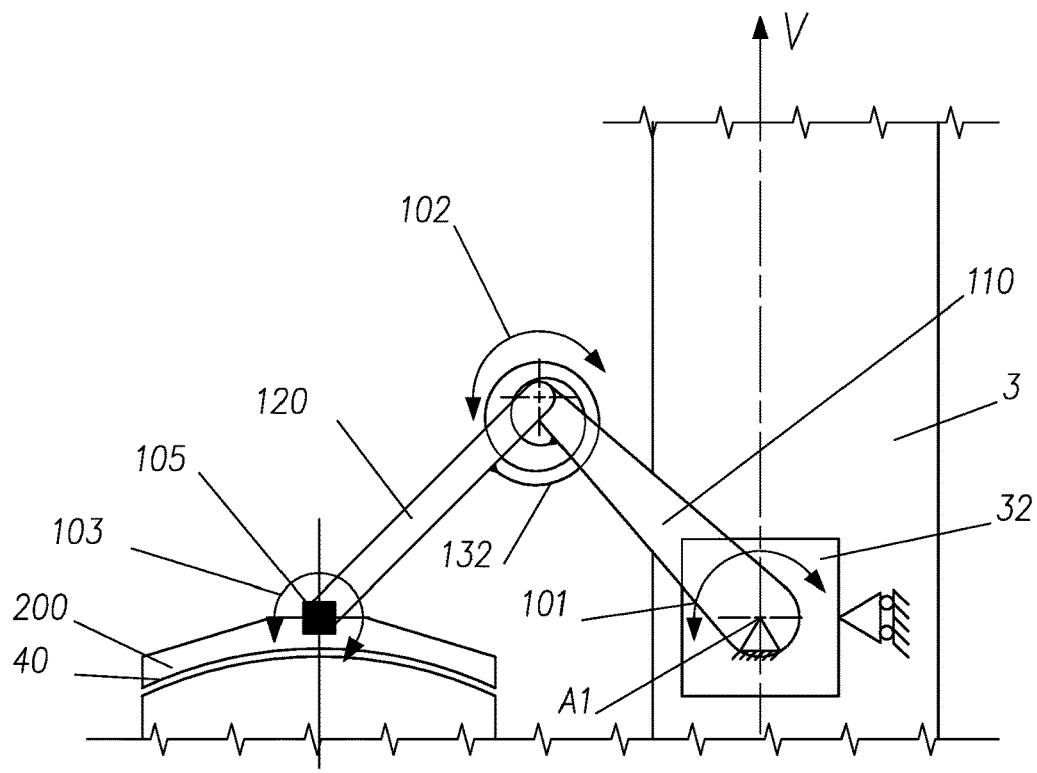

An embodiment is shown in FIG. 4, in which the spring element is formed as coil spring 132, which is arranged between the two lever arms 110 and 120. In the alternative, a mechanical spring, which is shown in FIGS. 1-3, or an electromechanical spring element 130, which is shown in FIG. 5 and which will be described below, can also be used.

An embodiment is shown in FIG. 5, in which the spring element 130 is formed as electromechanical spring element 130, which has, for example, a linear motor and an electrical energy storage 133. Electrical energy storages 133, e.g. capacitors or accumulators, can be used in operative connection with a mechanical device as electromechanical spring element 130. The linear motor consists of a rotor 135, which moves like a carriage, and a stationary stator 134. It is known that rotor 135 as well as stator 134 are equipped with electromagnets with opposite polarity. If they are energized, the rotor 135 moves opposite to the stator 134, and a linear movement is created. Vice versa, an electric motor or linear motor can also be operated as generator, i.e. electrical energy, which can be stored in the electrical energy storage 133 (accumulator, capacitor), is generated by means of mechanical movement of the rotor 135. In the present invention, stator 134, rotor 135, and electrical energy storage 133 together act similarly to a spring element, and are thus referred to as electromechanical spring element.

As a whole, the use of such an electromechanical spring element 130 at this point provides a large energy-saving potential during the operation of the press transfer system because in the case of this exemplary embodiment, the first drive unit 101 is also supported, and can thus be dimensioned to be smaller. This electromechanical spring element 130 can also be used in the embodiments shown in FIGS. 2, 3, 4, and 8.

Figure 7:
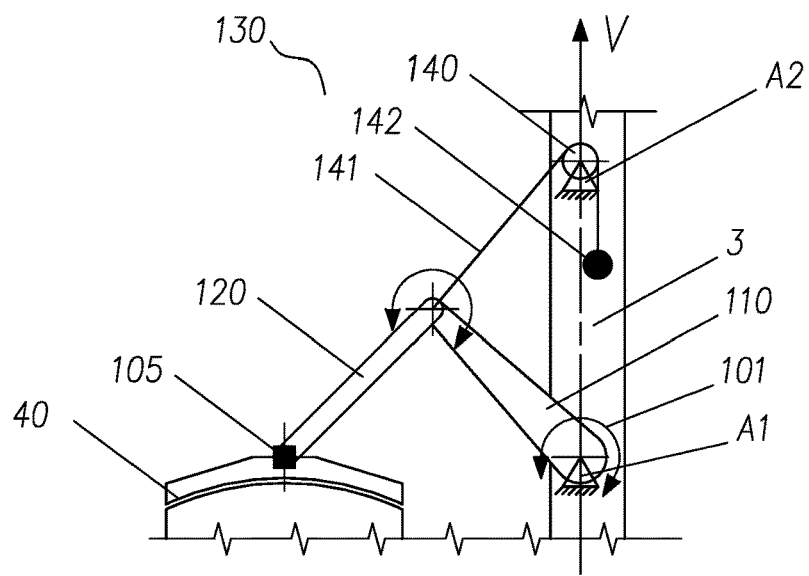
Figure 8:
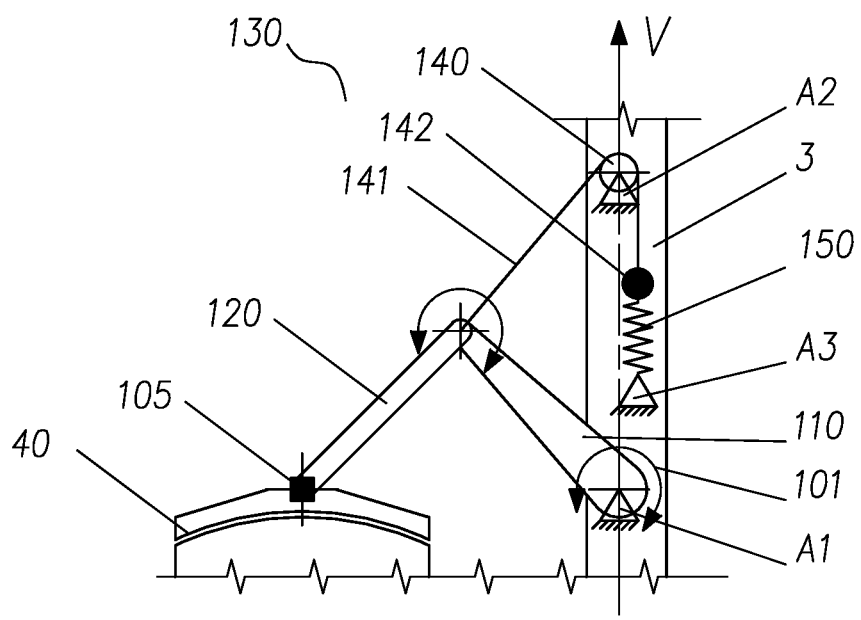

An embodiment is in each case shown in FIGS. 7 and 8, in which a deflection means 140 is provided, for example in the form of a deflection roller. The deflection means 140 is arranged on the second fastening region A2. In this embodiments, the energy-storing element 130 is formed from a pulling means 141, e.g. a rope or a belt, and a weight element 142, thus a mass. The weight element 142 is fastened to a first end of the pulling means 141. The second end of the pulling means 141 is fastened at a specified region of the movement arm, as already described for the embodiment as spring element 130. The second end is thus connected indirectly to the second fastening region A2 via the deflection means 140. Advantageously, the deflection means 140 is a deflection roller and is arranged above the movement arm. This means that the second fastening region A2 is also arranged above the movement arm. The second end of the pulling means 141 is fastened close to the second end of the first lever arm 110. The pulling means 141 is deflected via the deflection means 140, so that the weight element 142 acts along the fastening unit 3, thus in a vertical axis V. Due to the deflection means 140, however, the force does not act in the vertical direction, as in the case of an already known weight compensation, but in the direction of movement of the crossbar 105. The potential energy of the weight element 142, thus of the mass, is therefore a function of its height position, which, in turn, is a function of the position of the movement arm during the motion sequence. If the movement arm moves from its initial position S into the first press 1, the weight element 142 is charged with potential energy via the drive unit 101 (because it is pulled upwards), and supports the braking process and thus the drive unit 101 when receiving the workpiece 40. When lifting and accelerating the workpiece 40 out of the tool, the weight element 142 likewise supports the drive unit 101, in that the maximum drive torque at the motor is reduced. During the transport of the workpiece 40 after passing the initial position S into the second press 2, the weight element 142 is lifted again and is thus charged with energy. It serves, in turn, as support during the braking, in order to be able to set down the workpiece 40 in the correct position in press 2.

The principle is thereby thus the same as in the case of the use of spring elements as energy-storing element 130, wherein the storing of the energy takes place in these embodiments via the change of the position and thus of the potential energy of the weight element 142.

In FIG. 8, the weight element 142 is additionally also combined with a spring element 150, which is fastened thereto with a first end. With a second end, the spring element 150 is connected to a third fastening region A3 arranged on the fastening unit 3. The third fastening region A3 is advantageously arranged below the second fastening region A2 and always below the weight element 142. The spring element 150 can thereby be formed like the spring element 130, which is used as energy-storing element, thus as mechanical spring element or pneumatic spring element or electromechanical spring element.

The variations shown in the figures are generally only exemplary embodiments. Any combination of setting means 30, lever arms 110, 120, energy-storing element 130, 132, and fastening regions A1, A2 can be used. The position of the fastening regions A1 and A2 among one another can additionally vary in some embodiments, i.e. fastening region A1 can lie above as well as below fastening region A2.

The press transfer unit moves a workpiece 40 by means of the movement arms and the crossbar 105 from a first machining station 1 based on a defined motion sequence of the movement arms to a second machining station 2. After setting down the workpiece 40, the movement arms move back to the first machining station 1 again based on a defined motion sequence, in order to receive a further workpiece 40 by means of the crossbar 105, or into the initial position S. The control of each press transfer unit or of several consecutive press transfer units takes place by means of a computing unit 300, which is either integrated as separate computing unit 30 into the controller of the press assembly, or a combination thereof.

The press transfer unit is responsible that the workpiece 40 is placed in the exact position and in the correct position on the bottom tool 13; 23, so that the machining can take place correctly. Due to the fact that it is necessary to provide a certain throughput of workpieces 40, the press transfer unit and the rams 11; 21 have to be moved accordingly, so that the movements of press transfer unit and ram 11; 21 are highly dynamic. It has to be ensured thereby that no collision occurs between press transfer unit or the components thereof, respectively, and the rams 11; 21. In the collision-critical region, the accurate position of the workpiece 40 or of the crossbar 105, respectively, is crucial. The drive units 101, 102 and optionally the pivot drive 103 are controlled accordingly. It is the goal thereby to attain a maximum number of production strokes. In the collision-free region, the accurate position plays a small role, reducing the load on the drive units 101, 102 is the main focus here, so that the drive units 101, 102 and optionally the pivot drive 103 are controlled so that the torques acting thereon are minimal. This is supported by means of the proposed energy-storing element 130, 132 in the various embodiments, in that it supports the first drive unit 101 in the collision-critical region by releasing the energy stored in the energy-storing element 130, 132 when removing the workpiece 40 or when moving out of the machining station 1, 2, respectively, as well as by charging the energy-storing element when setting down the workpiece 40 in the next machining station 1, 2, or when moving in, respectively, as will be described in detail below on the basis of the diagram shown in FIG. 9.

Figure 9:
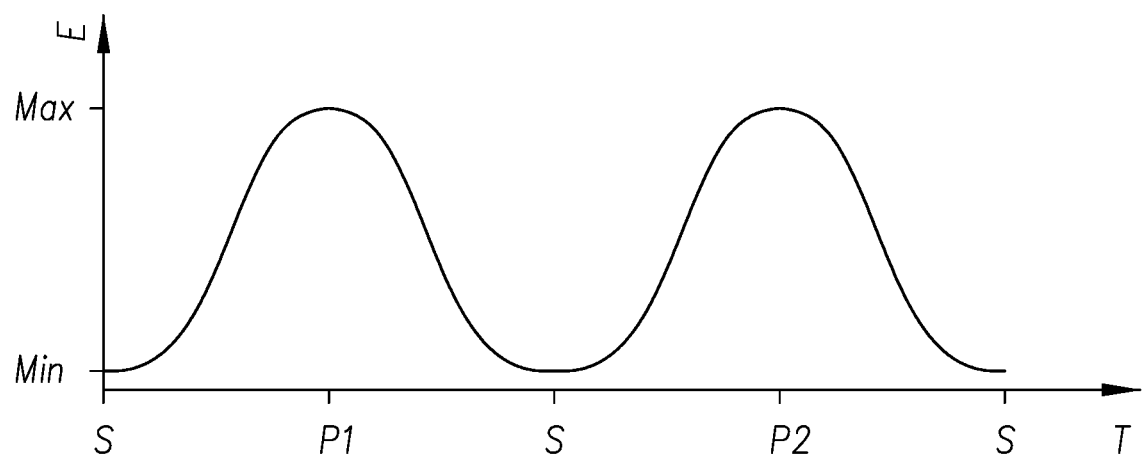
FIG. 9 shows an abstracted diagram of an exemplary energy flow of the energy-storing element over a complete motion sequence according to an embodiment of the present invention.

In an exemplary manner, FIG. 9 shows a schematic energy flow of the spring element 130, which is shown in FIG. 1 and which is embodied as mechanical tension spring, over a total motion sequence of the press transfer unit. The time is depicted on the horizontal axis T. The vertical axis E represents a qualitative value of the stored energy of the spring element 130, which, in the case of a mechanical spring element 130, is a tensional energy. The motion sequence starts on the time axis T with the initial position S, and is continued with the first position P1, in which the workpiece 40 is received. The press transfer unit subsequently moves with the workpiece 40 into the second position P2, wherein it thereby passes the initial position S. In the second position P2, i.e. the next machining station 2, the workpiece 40 is set down and the press transfer unit moves back to the initial position S. A movement cycle is thus concluded and can start again.

It is illustrated on the vertical energy axis E, how the spring element 130 has a minimal energy in the initial position S. The stored energy in the spring element 130 increases to a maximum, while the press transfer unit moves into the first position P1. When moving out of the first position P1 into the initial position S, the received energy is output again, thus sinks to a minimum again. When continuing to move into the second position P2, the stored energy of the spring element 130 increases to a maximum again, i.e. the spring is tensioned again, in order to output the received energy again when returning from the second position P2 into the initial position S.

When moving into the collision-critical regions and when moving out of the collision-critical regions, in which the first and second position P1 and P2 are located, high drive and braking torques of the drives 101 and 102 are required by braking hard and by high acceleration of the crossbar 105. High drive and braking torques are not required in the region, which is not collision-critical, around the initial position S.

Viewed over time, the energy-storing element 130, 132 is charged with energy slowly in all embodiments until reaching the position P1 or P2, respectively, in order to output energy quickly after leaving the position P1 or P2, respectively. As a whole, i.e. viewed over an entire motion sequence, this decreases the required amount of energy for moving the movement arms by means of acceleration on the one hand and by braking the movement arms on the other hand. An energy saving is thus attained directly. Due to the fact that the maximum drive torques are additionally reduced, smaller drive units 101, 102 with lower dead weight can be used, wherein, in turn, small drive torques and less energy are required for operating the press 1, 2. An energy saving is thus likewise realized indirectly.

Figure 10:
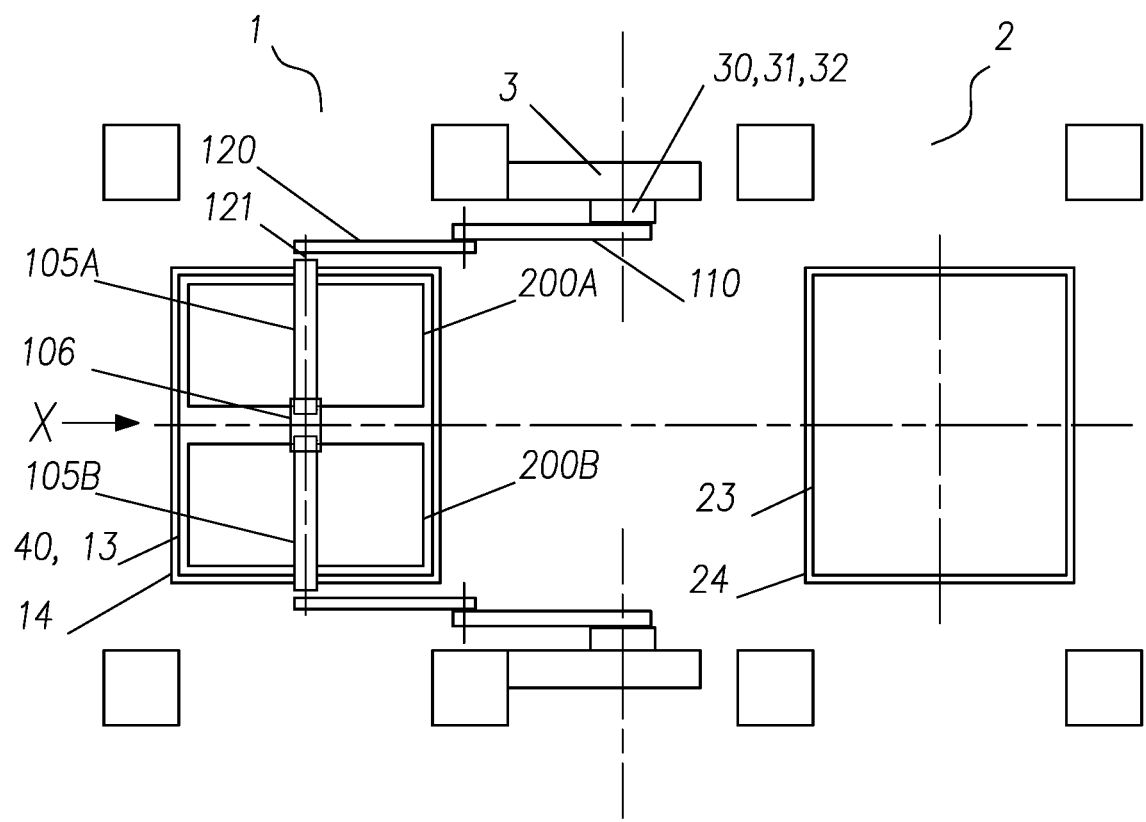
FIG. 10 shows a schematic top view into a press comprising a divided crossbar according to an embodiment of the present invention.

In a further embodiment, which is illustrated schematically in FIG. 10, it is provided that the crossbar 105 consists of two partial crossbars 105A, 105B, which can be connected to one another via a coupling point 106. In the case of a divided crossbar 105, the tooling 200 fastened thereto can likewise be divided into two partial toolings 200A, 200B. At least on one of its connecting points, e.g. the connection 121 on the second lever arm 120, the crossbar 105 has a length compensation to other components of the press. In the case of the divided crossbar 105, said length compensation can alternatively also be provided on the coupling point 106.

The partial crossbars 105A, 105B can be connected to one another or uncoupled manually or in an automated manner via the coupling point 106, e.g. for an automatic tool change. The coupling point 106 preferably lies in the center of the crossbar 105, so that the partial crossbars 105A, 105B essentially have the same length. The tooling 200, which is fastened to the crossbar 105, for receiving the workpieces 40, can likewise be embodied so as to be divided, so that at least two partial toolings 200A, 200B are then available. In the case of an automated coupling point of the crossbar 105, it is required that the tooling 200 is likewise embodied so as to be divided according to the coupling point 106.

If the two partial crossbars 105A, 105B are uncoupled, e.g. for a tool change or for an operation with a different motion sequence, a fixation of the movable connection between the second lever arm 102 and the crossbar 105 has to take place.

The coupling point 106 can be formed rigidly or in an articulated manner, or with length compensation, or in an articulated manner with length compensation. If the coupling point 106 is embodied in an articulated manner, with length compensation, or in an articulated manner with length compensation, the tooling 200 is to therefore also be embodied so as to be divided.

Even though a divided crossbar is present in DE 10 2006 037 365 B4, which has already been mentioned, the two crossbar parts are always connected to one another and can be adjusted relative to one another in different directions, in order to provide for corresponding position adaptations of the tooling due to different tool designs in the case of multiple tools for multiple parts.

In contrast, two crossbar parts 105A, 105B are provided according to the invention, which can be uncoupled from one another and which make it possible that only one movement arm is operated. This can be advantageous in order to optimize the tool change process or when the two movement arms, which are located opposite one another, have to be moved independently of one another (with different motion sequence), when e.g., position changes of the workpiece are required for the machining process or during transport routes.

In a further embodiment, only one of the movement arms from one press transfer unit is operated. For this purpose, the crossbar 105 is divided at the coupling point 106, so that the movement arms are no longer connected to one another. The embodiment can be used for smaller workpieces 40, i.e. in the case of lower masses, which are to be moved, shorter transport routes, etc.

In the case of a further embodiment of the one-sided operation, two movement arms can be used or provided, respectively, one behind the other in the transport direction X for transporting a jointly received workpiece 40. This means that a further movement arm is operated downstream from or upstream of the movement arm, which supports it during the transport of the workpiece 40. During the joint transport of the workpiece 40, the two movement arms have to be operated with the same motion sequence, whereas they can be operated independently of one another without the workpiece 40, in order to optimize the entire transfer procedure.

LIST OF REFERENCE NUMERALS

1; 2 machining station, press
11; 21 ram
12; 22 top tool
13; 23 bottom tool, rests on 14
14; 24 press bed
3 fastening unit
30-32 setting means
101 first drive unit
102 second drive unit
103 pivot drive
104 deflection device
105 crossbar
105A, 105B partial crossbars
106 coupling point
110 first lever arm or crank, respectively
120 second lever arm or rocker, respectively
121 connection on the second lever arm 120
131 third lever arm
130, 132 energy-storing element
133 electrical energy storage
134, 135 stator, rotor of the linear motor
140 deflection means
141 pulling means
142 weight element
150 spring element
200 tooling
200A, 200B partial tooling
300 control unit
40 workpiece
V vertical axis
A1, A2 first fastening region, second fastening region
A3 third fastening region
M12 step distance/distance of the machining stations
X transport direction or passage direction, respectively, or direction of movement, respectively
E vertical axis, energy of a spring element, tensional energy
T horizontal axis, time axis
P1, P2 first/second position
S initial position

The invention claimed is:

1. A transfer system for presses, comprising:
at least two fastening units arranged opposite one another, wherein each of the fastening units has a first fastening region;
a press transfer unit comprising two movement arms arranged opposite one another and a crossbar connected thereto for receiving and for transporting a workpiece, wherein each of the movement arms has a first drive unit connected to the first fastening region, a first lever arm, a second drive unit, and a second lever arm, and
wherein the first lever arm is connected at a first end thereof, or between the first end and a second end, to the first drive unit, and at the second end thereof is connected to the second drive unit, and
wherein the second lever arm is rotatably connected at a first end thereof to the second drive unit, and is movably connected with a second end thereof to the crossbar; and
at least one energy-storing element for each movement arm, the at least one energy-storing element being formed and arranged such that a force or a force component thereof points in an acceleration direction of the crossbar with or without the workpiece, wherein:
a second fastening region is provided on each fastening unit, and the at least one energy-storing element is connected directly or indirectly with a first end thereof to the second fastening region, and is fastened on a second end thereof at a specified region of the movement arm, and/or
the at least one energy-storing element is fastened with a first end to the first lever arm and with a second end thereof to the second lever arm,
wherein the movement arms have an initial position, in which at least the first lever arm stands virtually in a vertical axis, and are moved from the initial position into a first position by means of a specified motion sequence, and are moved into a second position and back by passing the initial position; and
wherein the at least one energy-storing element is configured such that it has a minimally stored energy in the initial position, and is charged with energy to a specified degree in a movement phase between the initial position and the first position and/or between the initial position and the second position, and
outputs the stored energy in a movement phase between the second position and the initial position and/or between the first position and the initial position.

2. The transfer system of claim 1, wherein the workpiece is received by means of the crossbar in the first position and is set down in the second position.

3. The transfer system of claim 1, further comprising a pivot drive arranged on the movement arm and configured to rotate the crossbar about a longitudinal axis or close to the longitudinal axis.

4. The transfer system of claim 3, wherein the pivot drive is provided in combination with a mechanical deflection device, the mechanical deflection device configured to hold the crossbar in a horizontal position.

5. The transfer system of claim 1, wherein the first drive unit is arranged between the first end and the second end of the first lever arm, and the at least one energy-storing element is connected to the first end.

6. The transfer system of claim 1, wherein the first drive unit is arranged between the first end and the second end of the first lever arm, and a third lever arm is provided, the third lever arm rotatably fastened with a first end thereof to the first end of the first lever arm, and with a second end thereof to a third fastening region, the third fastening region provided on each fastening unit and configured to be shifted in a vertical direction, and wherein the at least one energy-storing element is connected to the second end of the third lever arm.

7. The transfer system of claim 1, wherein the at least one energy-storing element is formed as a mechanical spring element a pneumatic spring element or a electromechanical spring element.

8. The transfer system of claim 1, wherein a deflection means is provided on the second fastening region, and the at least one energy-storing element includes has a pulling means and a weight element fastened to a first end of the pulling means, and wherein the second end of the pulling means is fastened to the specified region of the movement arm, and wherein the pulling means is guided via the deflection means.

9. The transfer system of claim 8, further comprising:
  a third fastening region arranged on each fastening unit; and
  a spring element, wherein the spring element is fastened with a first end to the weight element and with a second end to the third fastening region.

10. The transfer system of claim 9, wherein the spring element is formed as a mechanical spring element, a pneumatic spring element or an electromechanical spring element.

11. The transfer system of claim 1, further comprising at least one setting means arranged on each fastening unit, on which the first and second fastening regions are arranged, wherein at least one of the setting means are configured to be shifted in height along a vertical axis.

12. The transfer system of claim 11, wherein each setting means and/or a third fastening region is formed as a guided carriage.

13. The transfer system of claim 11, wherein:
  the setting means is formed in one piece such a way that the first and second fastening regions are arranged thereon at a specified distance from one another, or
  the setting means is formed in a plurality of pieces such that a respective one of the first and second fastening regions is arranged on one of the setting means, wherein each setting means is configured to be adjusted individually.

14. The transfer system of claim 1, wherein the first and/or the second lever arm are formed so that a length thereof is configured to be set.

15. The transfer system of claim 1, wherein the first and/or the second lever arm are formed so that a length thereof is configured to be changed dynamically.

16. The transfer system of claim 1, wherein the first and the second lever arm have lengths which are identical or different from one another.

17. The transfer system of claim 1, wherein the crossbar has a length compensation on one of its two ends.

18. The transfer system of claim 1, wherein the crossbar consists of comprises two partial crossbars, which can be coupled to one another at a coupling point.

19. The transfer system of claim 18, further comprising a tooling fastened to the crossbar, the tooling being divided according to the coupling point.

20. The transfer system of claim 18, wherein the coupling point is formed rigidly, in an articulated manner, with length compensation, or in an articulated manner with length compensation.

21. The transfer system of claim 18, wherein in an event that the two partial crossbars are uncoupled from one another, only one of the movement arms of the press transfer unit is operated.

22. The transfer system of claim 21, further comprising a further movement arm provided in a transport direction downstream from or upstream of the movement arm which is operated, and for joint transport of the workpiece is operated with a same motion sequence thereto, and can configured to be otherwise be operated independently thereof.

23. A press, comprising:
  the transfer system of claim 1, wherein the fastening units (3) are attached to a press frame of the press.

24. A press, comprising:
  the transfer system of claim 1; and
  a frame detached from the press to which the fastening units are attached.

25. A press assembly, comprising:
  a first press; and
  a second press, wherein each of the first press and the second press comprises:
    at least two fastening units arranged opposite one another, wherein each of the fastening units has a first fastening region;
    a press transfer unit comprising two movement arms arranged opposite one another and a crossbar connected thereto for receiving and transporting a workpiece,
      wherein each of the movement arms has a first drive unit connected to the first fastening region, a first lever arm, a second drive unit and a second lever arm, and
      wherein the first lever arm is connected at a first end thereof, or between the first end and a second end, to the first drive unit, and at the second end thereof is connected to the second drive unit, and
      wherein the second lever arm is rotatably connected at a first end thereof to the second drive unit, and is movably connected with a second end thereof to the crossbar; and
    at least one energy-storing element for each movement arm, the at least one energy-storing element being formed and arranged such that a force or a force component thereof points in an acceleration direction of the crossbar with or without the workpiece, wherein at least one of:
      a second fastening region is provided on each fastening unit, and the at least one energy-storing element is connected directly or indirectly with a first end thereof to the second fastening region, and is fastened on a second end thereof at a specified region of the movement arm, or the at least one energy-storing element is fastened with a first end to the first lever arm and with a second end thereof to the second lever arm, wherein the movement arms have an initial position, in which at least the first lever arm stands virtually in a vertical axis, and are moved from the initial position into a first position by means of a specified motion sequence, and are moved into a second position and back by passing the initial position; and wherein the at least one energy-storing element is configured such that it has a minimally stored energy in the initial position, and is charged with energy to a specified degree in a movement phase between the initial position and the first position or between the initial position and the second position, and outputs the stored energy in a movement phase between the second position and the initial position or between the first position and the initial position; and wherein the second press is arranged behind the first press and in a specified machining direction such that the workpiece is configured to be transferred from the first press to the second press by the movement arms.

26. The press assembly of claim 25, wherein a press transfer system for each of the first press and the second press are arranged centrally between the first press and the second press.

27. The press assembly of claim 25, wherein:

the first press of the press assembly includes two additional fastening units are arranged opposite one another, which are arranged on a side of the first press (1), from which the workpiece is fed to the press assembly for a first time for machining purposes, and/or the second press includes two additional fastening units, which are arranged opposite one another, which are arranged on a side of the second press, from which they are removed from the press assembly after a last machining.

* * * * *